United States Patent
Mynhier et al.

(10) Patent No.: US 9,556,997 B2
(45) Date of Patent: Jan. 31, 2017

(54) LARGE DIAMETER PIPE PLUG

(71) Applicant: Oceaneering International, Inc., Houston, TX (US)

(72) Inventors: Charles Robert Mynhier, Magnolia, TX (US); Mohamed Salhi, Katy, TX (US); William Price, Houston, TX (US)

(73) Assignee: Oceaneering International, Inc., Houston, TX (US)

(*) Notice: Subject to any disclaimer, the term of this patent is extended or adjusted under 35 U.S.C. 154(b) by 114 days.

(21) Appl. No.: 14/685,146

(22) Filed: Apr. 13, 2015

(65) Prior Publication Data

US 2015/0292667 A1  Oct. 15, 2015

Related U.S. Application Data

(60) Provisional application No. 61/979,430, filed on Apr. 14, 2014.

(51) Int. Cl.
 *F16L 55/10* (2006.01)
 *F16L 55/132* (2006.01)
 *F16L 55/136* (2006.01)

(52) U.S. Cl.
 CPC ............ *F16L 55/132* (2013.01); *F16L 55/136* (2013.01)

(58) Field of Classification Search
 CPC ........................... F16L 55/132; F16L 55/136
 USPC ... 138/89, 90; 220/323, 321, 318; 292/256.6
 See application file for complete search history.

(56) References Cited

U.S. PATENT DOCUMENTS

| | | | | |
|---|---|---|---|---|
| 4,307,818 A | * | 12/1981 | Singh | F16J 13/08 220/316 |
| 4,693,278 A | * | 9/1987 | Wilson | F16L 55/136 138/89 |
| 5,307,841 A | * | 5/1994 | Condon | F16L 55/132 138/89 |
| 6,286,553 B1 | * | 9/2001 | Morgan | F16J 13/08 138/89 |
| 6,439,415 B1 | * | 8/2002 | Salim | B01J 3/03 220/323 |
| 6,786,670 B2 | * | 9/2004 | Smith | B01J 3/03 138/89 |
| 7,546,847 B2 | * | 6/2009 | Morrison | F16L 55/136 137/317 |
| 8,596,484 B1 | * | 12/2013 | Haibel | F16J 13/10 220/262 |
| 9,056,701 B1 | * | 6/2015 | Haibel | B65D 45/28 |
| 2008/0092970 A1 | * | 4/2008 | Carnevali | F16L 55/132 138/89 |
| 2012/0279965 A1 | * | 11/2012 | Le Gall | F16J 13/02 220/233 |

* cited by examiner

*Primary Examiner* — Patrick F Brinson
(74) *Attorney, Agent, or Firm* — Maze IP Law, PC

(57) ABSTRACT

In embodiments, a large diameter, low pressure plug can be used to seal a pipe subsea. The large diameter, low pressure plug comprises a nose, two or more counter-rotating rings, and one or more seals. Other embodiments disclosed have varying additional structure. The large diameter, low pressure plug is inserted into the inner annulus of a tubular and a sealing action created by rotating the counter-rotating rings to create axial compression, in turn causing radial expansion in the seal against the inner annulus of the tubular, sealing the tubular.

20 Claims, 4 Drawing Sheets

LARGE DIAMETER PIPE PLUG

RELATION TO PRIOR APPLICATIONS

This application claims priority through U.S. Provisional Application 61/979,430 entitled "Large Diameter Pipe Plug" and filed on Apr. 14, 2014.

BACKGROUND

There is a need to seal open pipes subsea, especially a way to seal open pipes subsea using only a remotely operated vehicle ("ROV") for the installation of the seal.

DRAWINGS

Various figures are included herein which illustrate aspects of embodiments of the disclosed inventions.

DESCRIPTION OF EXEMPLARY EMBODIMENTS

Figure 1:
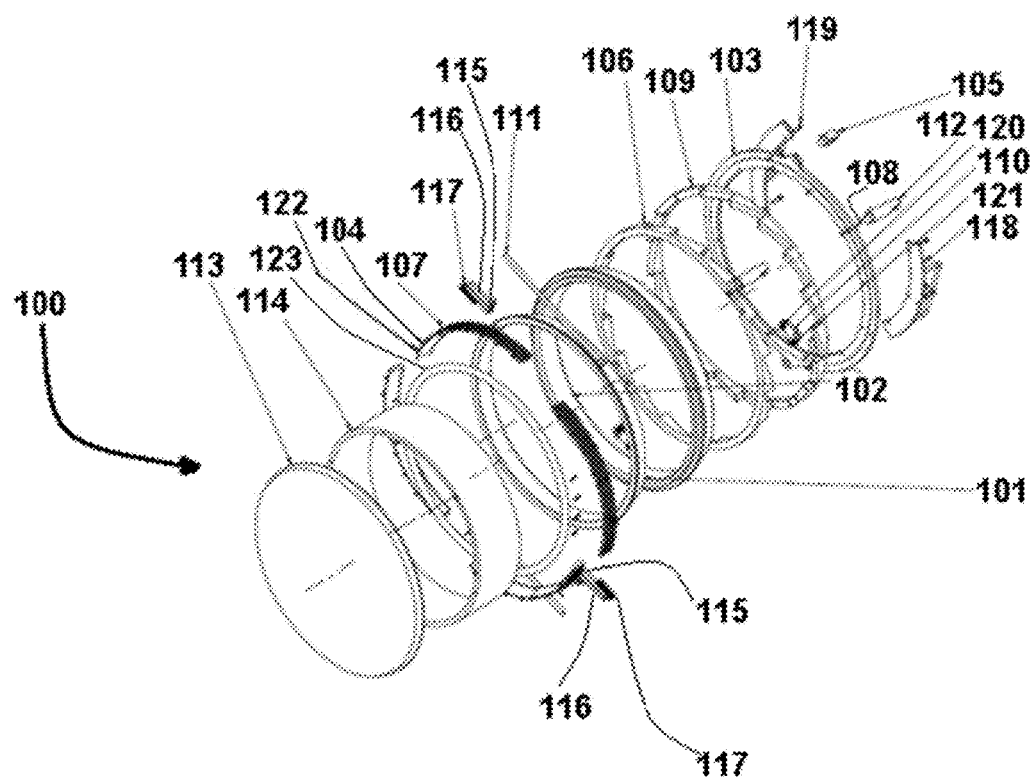
FIG. 1 is an exploded view in partial perspective of a first exemplary embodiment of the invention.
Figure 2:
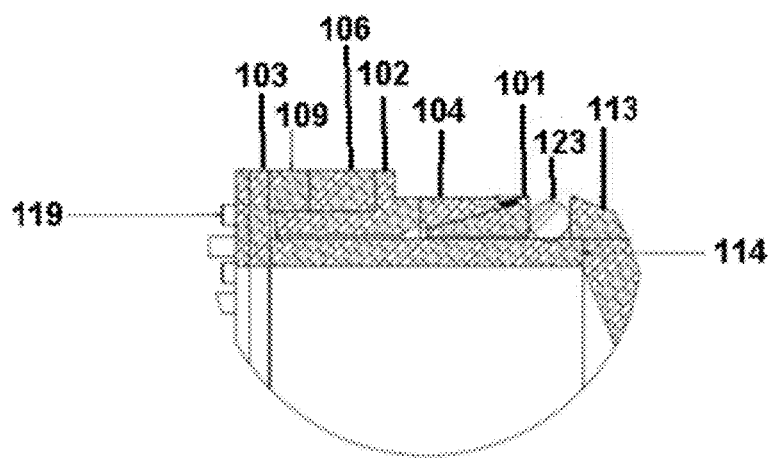
FIG. 2 is a cutaway view in partial perspective of the first exemplary embodiment of the invention.
Figure 6:
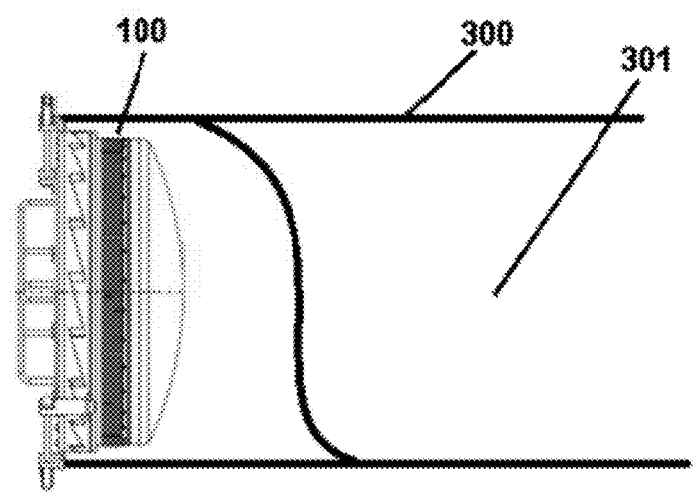
FIG. 6 is a cutaway view in partial perspective illustrating an exemplary embodiment of the invention inserted into a tubular.

Referring now to FIGS. 1-2, in a first embodiment large diameter, low pressure plug 100 comprises nose 113 configured to selectively be inserted into and fit within inner annulus 301 (FIG. 6) of tubular 300 (FIG. 6). In certain embodiments nose 113 comprises a convex leading face for which the convex portion will protrude in inner annulus 301 (FIG. 6) of tubular 300 (FIG. 6) when nose 113 is inserted into inner annulus 301. In certain embodiments, nose 113 comprises a substantially round outer boundary and collar 114 comprises a substantially round outer boundary which is complementary to the substantially round outer boundary of nose 113.

Collar 114 is connected to the nose 113 about an outer boundary of nose 113, where collar 114 is configured to slidingly fit within tubular 300.

Plate top 103 is connected to collar 114 opposite nose 113.

Slip bowl 101 is disposed proximate nose 113 about an outer surface of collar 114. Large diameter, low pressure plug 100 may further comprise first spring 122 disposed about an outer surface of slip bowl 101.

One or more O-rings 123 is disposed proximate the outer surface of collar 114 intermediate nose 113 and slip bowl 101. O-ring 123, which may comprise a large cross section and/or a large diameter, typically comprises a soft elastomeric material.

Slip 104 is disposed about an outer surface of slip bowl 101 in sliding communication with slip bowl 101. Slip 104 may comprise teeth and/or a serrated outer surface. In contemplated embodiments, slip 104 comprises a tapered edge and slip bowl 101 comprises a complementarily tapered edge in sliding communication with the slip tapered edge.

Nose 113, slip 104, and slip bowl 101 are configured to selectively position one or more O-rings 123 to a first position which does not form a seal between large diameter, low pressure plug 100 and inner annulus 301 of tubular 300 into which large diameter, low pressure plug 100 is positioned and to a second position which does form a seal between large diameter, low pressure plug 100 and inner annulus 301 of tubular 300 into which large diameter, low pressure plug 100 is positioned.

A set of counter-rotating rings 106, 109 comprises bottom ramp 106, disposed about the outer surface of collar 114 proximate plate top 103, and top ramp 109, disposed about the outer surface of collar 114 intermediate plate top 103 and bottom ramp 106. Top ramp 109 is in communication with bottom ramp 106. In certain embodiments, bottom ramp 106 and top ramp 109 are arranged in a counter-rotating relationship relative to each other and are further configured to produce an axial force to compress O-ring 123. An assembly comprising one or more screw cap socket heads 107, square nuts 115 (or the like), screw tubes 116 (or the like), and springs 117 may be present and disposed proximate collar 114.

Slip pusher 102 is disposed at least partially intermediate bottom ramp 106 and slip 104 about the outer surface of collar 114 and is in communication with slip 104. Slip pusher 102 may be configured to engage an end portion of tubular 300 (FIG. 6) and at least partially impede insertion of large diameter, low pressure plug 100 into annulus 301 (FIG. 6) of tubular 300 (FIG. 6).

Bolt setter 111 is in communication with the outer surface of slip bowl 101 and is configured to provide axial movement to at least one of bottom ramp 106 and top ramp 109. Bolt setter 111 can be hydraulically actuated, actuated mechanically via a wrench or remotely operated vehicle (ROV), or the like, or a combination thereof. Bolt setter 111 can comprise a hydraulic pump and/or cylinder and typically turns and moves top ramp 109 against bottom ramp 106. In certain embodiments, bolt setter 111 comprises a plurality of bolt setters 111 disposed at least partially opposite each other.

Large diameter, low pressure plug 100 may further comprise ROV handle 118 connected to plate top 103.

Figure 3:
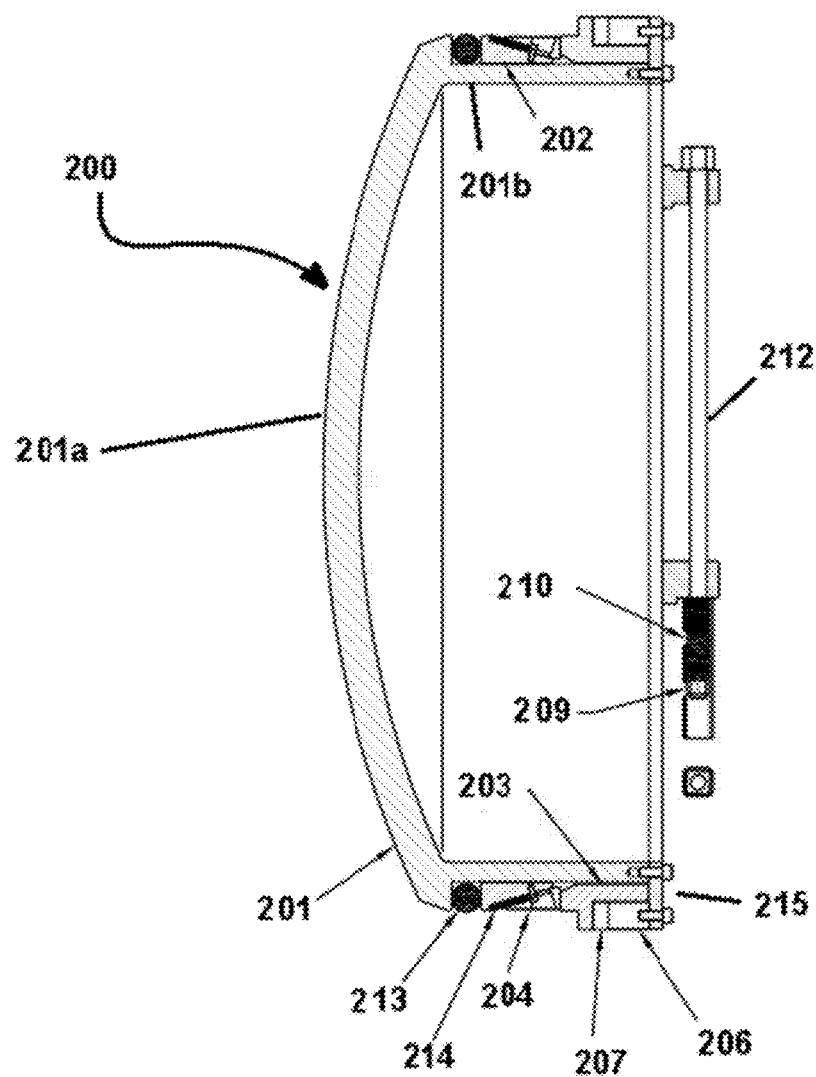
FIG. 3 is an cutaway view in partial perspective of a second exemplary embodiment of the invention.
Figure 4:
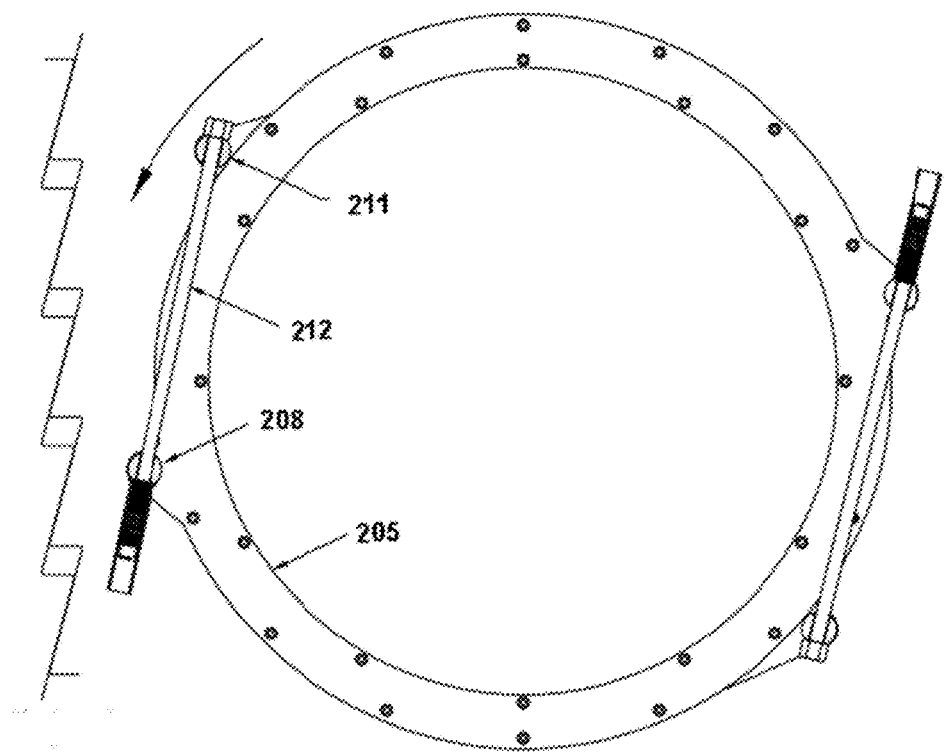
FIG. 4 is an end view in partial perspective of the second exemplary embodiment of the invention.

Referring now to FIGS. 3-4, in a further embodiment, large diameter, low pressure plug 200 comprises leading nose 201 configured to be insertable into inner annulus 301 (FIG. 6) of tubular 300 (FIG. 6), where leading nose 201 comprises substantially circular descending collar 201b and substantially solid convex leading face 201a, which can be convex.

Back plate 215 is connected to descending collar 201b and disposed opposite solid leading face 201a.

A set of set of counter-rotating rings comprises one or more conical ramp rings 206, connected to back plate 215 and disposed about an outer surface of descending collar 201b, and counter-rotating ramp ring 207, disposed about an outer surface of descending collar 201b intermediate at least one conical ramp ring 206 and slip pusher 203. Counter-rotating ramp ring 207 is in communication with slip pusher 203. Conical ramp ring 206 may be configured to be stationary with respect to counter-rotating ramp ring 207.

Slip pusher 203 is disposed about an outer surface of descending collar 201b intermediate at least one conical ramp ring 206 and descending collar 201b. Slip pusher 203 is in communication with back plate 215.

First slip 204 comprises a tapered edge and is disposed about the outer surface of descending collar 201b intermediate slip pusher 203 and leading nose 201. First slip 204 is in communication with slip pusher 203. In embodiments, first slip 204 comprises a serrated outer surface.

Sliding slip bowl 202 comprises a tapered edge which is complimentarily tapered with respect to and engaged with the tapered edge of first slip 204 and is disposed about the outer surface of descending collar 201b intermediate first slip 204 and leading nose 201.

One or more large cross section, large diameter O-rings 213 are disposed intermediate sliding slip bowl 202 and substantially solid leading face 201a. Counter-rotating ramp ring 207 is configured to produce an axial force to compress O-ring 213. O-ring 213 typically comprises a soft elastomeric material.

Setting screw 212, which is operatively in communication with conical ramp ring 206 and counter-rotating ramp ring 207, is configured to selectively rotate or counter-rotate at least one of conical ramp ring 206 and counter-rotating ramp ring 207.

Figure 5:
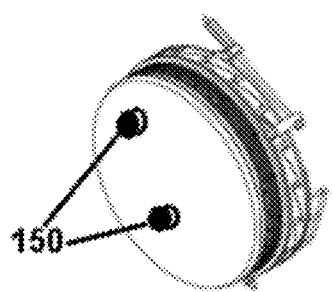
FIG. 5 is a view in partial perspective of an embodiment of the invention comprising a plurality of ports.

Referring now to FIG. 5, in either embodiment described above one or more ports 150 may be present and adapted to removably receive a hose (not shown in the figures) which may be attachable via a complimentary hot stab. Ports 150, e.g. 3 inch connections, may be configured to be opened or closed as needed and may be placed where and as needed, e.g. proximate nose 113 (FIG. 1) or nose 201 (FIG. 3). Ports 150 may comprise a connector such as a hydraulic connector, a check valve, or the like, or a combination thereof.

In the operation of exemplary embodiments, a pipe, e.g. tubular 300, may be sealed subsea by maneuvering large diameter, low pressure plug 100 proximate an open end of tubular 300. The operation described herein applies equally to large diameter, low pressure plug 200. One or more ROV handles 118 may be used to aid in positioning large diameter, low pressure plug 100.

Referring to FIG. 6 and additionally to FIGS. 1 and 2, when positioned to its desired proximity of tubular 300, large diameter, low pressure plug 100 is inserted into inner annulus 301 of tubular 300, with nose 113 leading into inner annulus 301. When inserted sufficiently, e.g. when a ledge such as slip pusher 102 or back plate 215 engages an open end portion of tubular 300, axial compression is applied by rotating top ramp 109 against bottom ramp 106. The rotational movement is translated to axial movement due to meshing angles in both top ramp 109 and bottom ramp 106. A sealing action is created by rotating a set of counter-rotating rings, e.g. top ramp 109 against bottom ramp 106 or conical ramp ring 206 with respect to counter-rotating ramp ring 207. This causes radial expansion in a seal, such as O-ring 123 or O-ring 213, against inner annulus 301 of tubular 300 by the rotation of one ring of the set of counter-rotating rings with respect to the other ring or rings of the set of counter-rotating rings.

In configurations, the leading portion of large diameter, low pressure plug 100, i.e. nose 113, is shaped to withstand internal pressure within inner annulus 301, e.g. convexly, such that the internal pressure, e.g. from fluid present in inner annulus 301, does not push large diameter, low pressure plug 100 out from inner annulus 301 once large diameter, low pressure plug 100 is secured within inner annulus 301.

Conical ramp ring 206 may be configured with one or more protruding arms 112 and a corresponding set of springs 110, each of which is connected to a corresponding protruding arm 112. In such embodiments, each such protruding arm 112 is allowed to compress its spring 110 which operates to maintain tension of a preload and insure that protruding arm 112 does not come off. When started, this action keeps spring 110 and applied torque, e.g. with a wrench or the like, will overcome the force exerted by spring 110.

Large diameter, low pressure plug 100 may be locked into place using hydraulic pressure and toothed slips 104. In an embodiment, first slip 104 comprises a serrated edge which is used to bite axially into inner annulus 301 to prevent large diameter, low pressure plug 100 from being pushed out of inner annulus 301. First slip 104 may be expanded by pushing slip bowl 101 underneath first slip 104 with the same axial force that compresses O-ring 113. In other configurations, slip pusher 203 is pushed underneath first slip 204 to compress O-ring 113.

In embodiments, protruding arm 112 comprises a plurality of opposing protruding arms 112 which may be pulled toward each other. In other embodiments, setting screw 212 comprises a plurality of opposing setting screws 212 which may be pulled toward each other.

A slight axial movement may be caused with pressure the large diameter, low pressure plug 100 is designed to hold and the slight axial movement used to relax the axial setting force of conical ramp rings 206. Moreover, an original setting force of conical ramp rings 206 may be restored by having conical ramp rings 206 brought even closer together using stored energy in one or more compressed springs 210.

If ports 150 are present, they may be used to help stabilize pressure within tubular 300 such as when retrieving or otherwise repositioning tubular 300.

The foregoing disclosure and description of the inventions are illustrative and explanatory. Various changes in the size, shape, and materials, as well as in the details of the illustrative construction and/or an illustrative method may be made without departing from the spirit of the invention.

We claim:
1. A large diameter, low pressure plug, comprising:
a. a nose configured to fit within an inner annulus of a tubular;
b. a collar connected to the nose about an outer boundary of the nose, the collar configured to fit within the tubular;
c. a plate top connected to the collar opposite the nose;
d. a slip bowl disposed proximate the nose about an outer surface of the collar;
e. an O-ring disposed proximate the outer surface of the collar intermediate the nose and the slip bowl;
f. a slip disposed about an outer surface of the slip bowl in sliding communication with the slip bowl, the nose, slip, and slip bowl configured to selectively position the O-ring to a first position which does not form a seal between the large diameter, low pressure plug and the inner annulus of the tubular into which the large diameter, low pressure plug is positioned and to a second position which does form a seal between the large diameter, low pressure plug and the inner annulus of the tubular into which the large diameter, low pressure plug is positioned;
g. a bottom ramp disposed about the outer surface of the collar proximate the plate top;
h. a top ramp disposed about the outer surface of the collar intermediate the plate top and the bottom ramp, the top ramp in communication with the bottom ramp;
i. a slip pusher disposed at least partially intermediate the bottom ramp and the slip about the outer surface of the collar, the slip pusher in communication with the slip; and j. a bolt setter in communication with the outer surface of the slip bowl, the bolt setter configured to provide axial movement to at least one of the bottom ramp and the top ramp.

2. The large diameter, low pressure plug of claim 1, wherein the nose comprises a convex leading face.

3. The large diameter, low pressure plug of claim 1, further comprising a first spring disposed about an outer surface of the slip bowl.

4. The large diameter, low pressure plug of claim 1, further comprising an ROV handle connected to the plate top.

5. The large diameter, low pressure plug of claim 1, wherein the slip comprises a serrated outer surface.

6. The large diameter, low pressure plug of claim 1, wherein the O-ring comprises soft elastomeric material.

7. The large diameter, low pressure plug of claim 1, wherein the O-ring comprises a large cross section, large diameter O-ring.

8. The large diameter, low pressure plug of claim 1, wherein the bottom ramp and the top ramp are arranged in a counter-rotating relationship relative to each other and are further configured to produce an axial force to compress the O-ring.

9. The large diameter, low pressure plug of claim 1, wherein the slip pusher is configured to engage an end portion of the tubular and at least partially impede insertion of the large diameter, low pressure plug into the annulus of the tubular.

10. The large diameter, low pressure plug of claim 1, further comprising a selectively closable port configured to removably receive a fluid hose.

11. A large diameter, low pressure plug, comprising:
   a. a leading nose configured to be insertable into an inner annulus of a tubular, the leading nose comprising a substantially circular descending collar and a substantially solid convex leading face;
   b. a back plate connected to the descending collar and disposed opposite the solid leading face;
   c. a conical ramp ring connected to the back plate and disposed about an outer surface of the descending collar;
   d. a slip pusher disposed about an outer surface of the descending collar intermediate the conical ramp ring and the descending collar, the slip pusher in communication with the back plate;
   e. a counter-rotating ramp ring disposed about an outer surface of the descending collar intermediate the conical ramp ring and the slip pusher, the counter-rotating ramp ring in communication with the slip pusher;
   f. a first slip comprising a tapered edge, the first slip disposed about the outer surface of the descending collar intermediate the slip pusher and the leading nose, the first slip in communication with the slip pusher;
   g. a sliding slip bowl comprising a tapered edge complimentarily tapered with respect to and engaged with the first slip tapered edge, the sliding slip bowl disposed about the outer surface of the descending collar intermediate the first slip and the leading nose;
   h. a large cross section, large diameter O-ring disposed intermediate the sliding slip bowl and the substantially solid convex leading face, the counter-rotating ramp ring configured to produce an axial force to compress the O-ring; and
   i. a setting screw operatively in communication with the conical ramp ring and the counter-rotating ramp ring and configured to selectively rotate or counter-rotate at least one of the conical ramp ring and the counter-rotating ramp ring with respect to each other.

12. The large diameter, low pressure plug of claim 11, wherein the O-ring comprises a soft elastomeric material.

13. The large diameter, low pressure plug of claim 11, wherein the first slip comprises a serrated outer surface.

14. The large diameter, low pressure plug of claim 11, wherein the conical ring is configured to be stationary with respect to the counter-rotating ramp ring.

15. A method of sealing a pipe subsea, comprising:
   a. maneuvering a large diameter, low pressure plug proximate an open end of a tubular, the large diameter, low pressure plug comprising:
      i. a nose configured to fit within an inner annulus of a tubular;
      ii. a ledge disposed opposite the nose and configured to impede progress of the large diameter, low pressure plug into an inner annulus of the tubular;
      iii. a set of counter-rotating rings; and
      iv. a seal;
   b. inserting the large diameter, low pressure plug into the inner annulus of the tubular; and
   c. creating a sealing action by:
      i. rotating the set of counter-rotating rings to create axial compression by the rotation of the set of counter-rotating rings; and
      ii. causing radial expansion in the seal against the inner annulus of the tubular by the rotation of one of the set of counter-rotating rings with respect to the other of the set of counter-rotating rings.

16. The method of sealing a pipe subsea of claim 15, wherein one counter-rotating ring of the set of counter-rotating rings further comprises a conical ramp ring, the method further comprising:
   a. providing the conical ramp ring with a protruding arm and a spring connected to the protruding arm; and
   b. allowing the protruding arm to compress the spring by removing force applied to the spring, allowing the spring to provide a pre-load force to keep the large diameter, low pressure plug energized.

17. The method of sealing a pipe subsea of claim 15, further comprising:
   a. providing a first slip with a serrated outer edge; and
   b. expanding the first slip by pushing the conical ramp ring underneath the first slip with the same axial force that compresses the seal.

18. The method of sealing a pipe subsea of claim 17, further comprising:
   a. providing the first slip with a serrated outer edge; and
   b. locking the large diameter, low pressure plug into place using hydraulic pressure to create an axial biting of the serrated edge of the first slip into the inner annulus to prevent the large diameter, low pressure plug from being pushed out of the inner annulus of the tubular.

19. The method of sealing a pipe subsea of claim 15, further comprising:
   a. causing slight axial movement with the pressure the large diameter, low pressure plug is designed to hold; and
   b. using the slight axial movement to relax the axial setting force of ramp rings.

20. The method of sealing a pipe subsea of claim 15, further comprising restoring an original setting force of the set of counter-rotating rings being brought even closer together using stored energy in compressed springs.

* * * * *